United States Patent
Fang et al.

(10) Patent No.: US 7,106,536 B2
(45) Date of Patent: Sep. 12, 2006

(54) WRITE HEAD DEMAGNETIZER

(75) Inventors: Hao Fang, Savage, MN (US); Stephen Carl Kuehne, Rosemount, MN (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 10/954,599

(22) Filed: Sep. 30, 2004

(65) Prior Publication Data

US 2006/0066973 A1    Mar. 30, 2006

(51) Int. Cl.
*G11B 5/02* (2006.01)
(52) U.S. Cl. .................. 360/67; 360/46; 360/66; 360/62; 327/110; 327/424
(58) Field of Classification Search ................ None
See application file for complete search history.

(56) References Cited

U.S. PATENT DOCUMENTS

| | | | | |
|---|---|---|---|---|
| 3,895,270 A * | 7/1975 | Maddox | ................ | 361/149 |
| 3,938,011 A | 2/1976 | Littwin | | |
| 4,221,316 A * | 9/1980 | Jenkins et al. | ............ | 226/35 |
| 4,360,854 A | 11/1982 | Schergen et al. | | |
| 4,466,027 A | 8/1984 | Howell et al. | | |
| 4,551,782 A | 11/1985 | Seely et al. | | |
| 4,730,230 A | 3/1988 | Helfrick | | |
| 4,821,127 A * | 4/1989 | Soga et al. | ............ | 360/66 |
| 4,825,331 A | 4/1989 | Armond | | |
| 4,887,184 A * | 12/1989 | Armond | ............. | 361/149 |
| 4,970,621 A * | 11/1990 | Gailbreath et al. | ......... | 361/149 |
| 5,396,369 A * | 3/1995 | Deland, Jr. et al. | .......... | 360/2 |
| 5,499,156 A * | 3/1996 | Bentley | .............. | 361/150 |
| 6,038,093 A * | 3/2000 | Takada et al. | ............. | 360/66 |
| 6,049,184 A * | 4/2000 | Uggla et al. | ............ | 318/434 |
| 6,052,017 A * | 4/2000 | Pidutti et al. | .............. | 327/424 |
| 6,166,869 A * | 12/2000 | Pidutti et al. | ............. | 360/46 |
| 6,259,305 B1 * | 7/2001 | Pakriswamy | ............ | 327/424 |
| 6,285,221 B1 * | 9/2001 | Leighton et al. | ............ | 327/110 |
| 6,441,654 B1 * | 8/2002 | Yamamoto | ............. | 327/110 |
| 6,545,514 B1 * | 4/2003 | Barrow | ............ | 327/110 |
| 6,650,526 B1 * | 11/2003 | Preller | ............ | 361/149 |
| 2005/0190467 A1 * | 9/2005 | Noguchi | ............ | 360/1 |
| 2005/0190476 A1 * | 9/2005 | Wilson et al. | ............ | 360/46 |
| 2005/0200997 A1 * | 9/2005 | Cronch et al. | ............ | 360/55 |

* cited by examiner

*Primary Examiner*—Wayne Young
*Assistant Examiner*—Dismery Mercedes
(74) *Attorney, Agent, or Firm*—Kinney & Lange, PA (57) ABSTRACT

A demagnetizer for an inductive load having a driver circuit including at least one transistor and a ramp-down voltage source switchably connected to the driver circuit, so that when the ramp-down voltage source is connected to the transistor, it drives the voltage of the transistor below its threshold voltage.

20 Claims, 7 Drawing Sheets

FIG. 7

WRITE HEAD DEMAGNETIZER

BACKGROUND

This invention relates to inductive magnetic heads, and particularly to eliminating or reducing remnant magnetization and residual flux in the inductive magnetic head.

Inductive magnetic heads are commonly used in magnetic disk drives for writing data to magnetic disks. The magnetic head is operated by driving a write current through the inductive coil of the magnetic head, and reversing the direction of the current to reverse the magnetic field generated by the head. Field reversals in the head induce changes in magnetic dipoles on the disk to represent data. While several types of current driver circuits are commonly used to drive current in opposite directions through the coil, one common circuit is an H-bridge circuit. An H-bridge circuit employs four transistor switches operated to direct write current through alternating pairs of the switches of the circuit.

For optimal performance, it is necessary to periodically clear the inductive head by removing remnant magnetization and residual flux from the write head. Remnant magnetization and residual flux in the write head may polarize or bias the read head and erase data, even when the write head is supposed to be turned off.

Information is written by placing the inductive head in one of two states, which correspond to a 1 and a 0 in digital information. Usually, the inductive head is cleared by turning off the current into the head. However, as magnetic recording head dimensions have become smaller, the shape anisotropy of the magnetic pole may cause the head to stay magnetized even after the current is removed. This results in unintentional erasure of data on the disk.

It is known that applying an alternating and diminishing magnetic field to a magnetic material will diminish the total magnetic induction in the material to a substantially small amount, and sometimes to zero, resulting in the material becoming essentially demagnetized. This method, sometimes called AC erasure, has been used in the past in industrial applications, such as demagnetizing metal tools and erasing bulk quantities of magnetic tapes. Typically, the magnetic field applied to the target is diminished by moving the target farther away from the source of the magnetic field.

Therefore, it is desirable to find a way to clear a small inductive head that may stay magnetized even after current no longer flows to the inductive head. It is also desirable to find a simple and inexpensive way to clear an inductive head of remnant magnetization in an H-bridge circuit.

BRIEF SUMMARY

According to one embodiment of the invention, a circuit including a ramp-down voltage source is connected by switches to an H-bridge circuit. When the circuit is engaged, it repeatedly alternates the polarity of the head current, while also causing the head current to decay. This gradually brings the gate voltages of the output drivers of the H-bridge circuit to the supply voltages, thereby demagnetizing the inductive write head. The embodiment provides a simple and inexpensive circuit that can be added to an H-bridge circuit in order to clear an inductive head.

DETAILED DESCRIPTION

Figure 1:
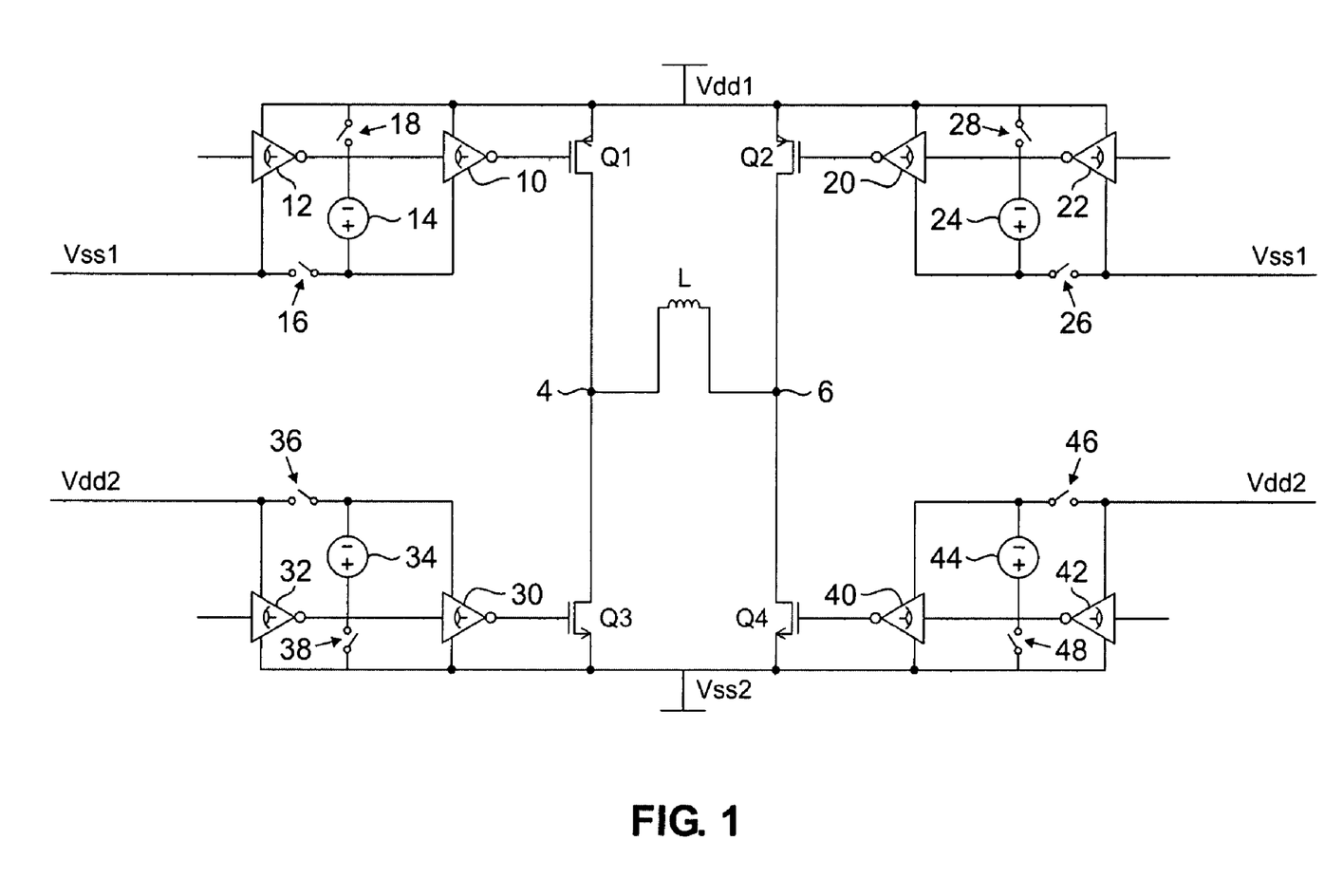
FIG. 1. is a circuit diagram of an H-bridge circuit for driving an inductive head that includes a circuit for demagnetizing the inductive magnetic head.

FIG. 1 illustrates an H-bridge circuit comprising transistors Q1, Q2, Q3 and Q4 connected in the form of an H, with transistors Q1 and Q3 forming one leg of the H, transistors Q2 and Q4 forming the other leg of the H, and with inductive coil L of the inductive magnetic head connected across the center of the H through load terminals 4 and 6. In the embodiment illustrated in the drawing, transistors Q1 and Q2 are PMOS field effect transistors having their sources connected to a positive voltage source Vdd1 and transistors Q3 and Q4 are NMOS field effect transistors having their sources connected to negative voltage source Vss2. The drains of transistors Q1 and Q3 are connected together and to load terminal 4 and the drains of transistors Q2 and Q4 are connected together and to load terminal 6.

The gates of transistors Q1–Q4 are connected to logic inverters. The gate of transistor Q1 is connected to the output of inverter 10, the gate of transistor Q2 is connected to the output of inverter 20, the gate of transistor Q3 is connected to the output of inverter 30, and the gate of transistor Q4 is connected to the output of inverter 40. The input of inverter 10 is connected to the output of inverter 12, the input of inverter 20 is connected to the output of inverter 22, the input of inverter 30 is connected to the output of inverter 32 and the input of inverter 40 is connected to the output of inverter 42. The inputs of inverters 12, 22, 32 and 42 are connected to the logic signals that control the H-bridge circuit.

Inverters 10, 12, 20 and 22 have upper supply voltages connected to Vdd1 and lower supply voltages connected to Vss1. Inverters 30, 32, 40 and 42 have upper supply voltages connected to Vdd2 and lower supply voltages connected to Vss2.

The circuit shown in FIG. 1 also contains four ramp-down voltage sources, each with a positive and a negative terminal. The positive terminal of ramp-down voltage source 14 is connected to the lower supply voltage of inverter 10. It is also connected to the lower supply voltage of inverter 12 and to Vss1 via switch 16. The negative terminal of ramp-down voltage source 14 is connected via switch 18 to Vdd1, the upper supply voltage of inverter 10 and the upper supply voltage of inverter 12. Similarly, the positive terminal of ramp-down voltage source 24 is connected to the lower supply voltage of inverter 20. It is also connected to the lower supply voltage of inverter 22 and to Vss1 via switch 26. The negative terminal of ramp-down voltage source 24 is connected via switch 28 to Vdd1, the upper supply voltage of inverter 20 and the upper supply voltage of inverter 22.

The negative terminal of ramp-down voltage source 34 is connected to the upper supply voltage of inverter 30. It is also connected to the upper supply voltage of inverter 32 and to Vdd2 via switch 36. The positive terminal of ramp-down voltage source 34 is connected via switch 38 to Vss2, the lower supply voltage of inverter 30 and the lower supply voltage of inverter 32. The negative terminal of ramp-down voltage source 44 is connected to the upper supply voltage of inverter 40. It is also connected to the upper supply voltage of inverter 42 and to Vdd2 via switch 46. The positive terminal of ramp-down voltage source 44 is connected via switch 48 to Vss2, the lower supply voltage of inverter 40 and the lower supply voltage of inverter 42.

During normal operation of the H-bridge circuit shown in FIG. 1, switches 16, 26, 36 and 46 are closed and switches 18, 28, 38 and 48 are open. In this normal operation mode, the H-bridge circuit functions like a typical H-bridge circuit. However, when the circuit is switched to its demagnetization mode, the positions of all the switches are reversed, so that switches 16, 26, 36 and 46 are open and switches 18, 28, 38 and 48 are closed. As a result, the lower supply voltages of inverters 10 and 20 will ramp to Vdd1, driving the gate voltages of transistors Q1 and Q2 to Vdd1. Because the source of transistor Q1 and the source of transistor Q2 are connected to Vdd1, the gate-source voltages of transistors Q1 and Q2 will drop below their threshold voltage, and transistors Q1 and Q2 will be cut-off. Similarly, the upper supply voltages of inverters 30 and 40 will ramp to Vss2, driving the gate voltages of transistors Q3 and Q4 to Vss2. Because the source of transistor Q3 and the source of transistor Q4 are connected to Vss2, the gate-source voltages of transistors Q3 and Q4 will drop below their threshold voltage, and transistors Q3 and Q4 will be cut-off.

Figure 2A:
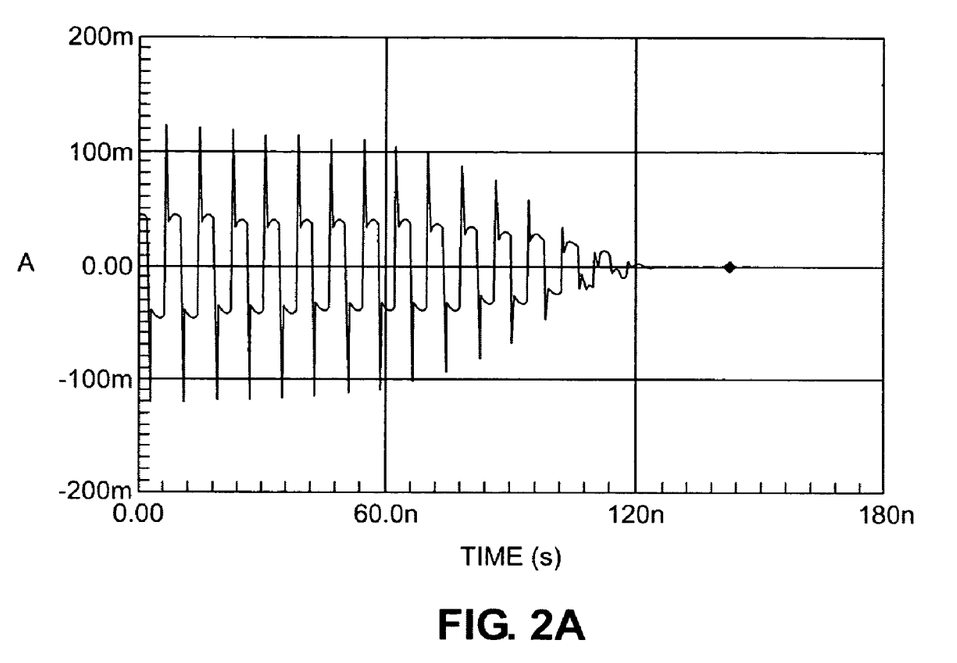
FIG. 2A is a current profile of an H-bridge circuit using the circuit shown in FIG. 1.
Figure 2B:
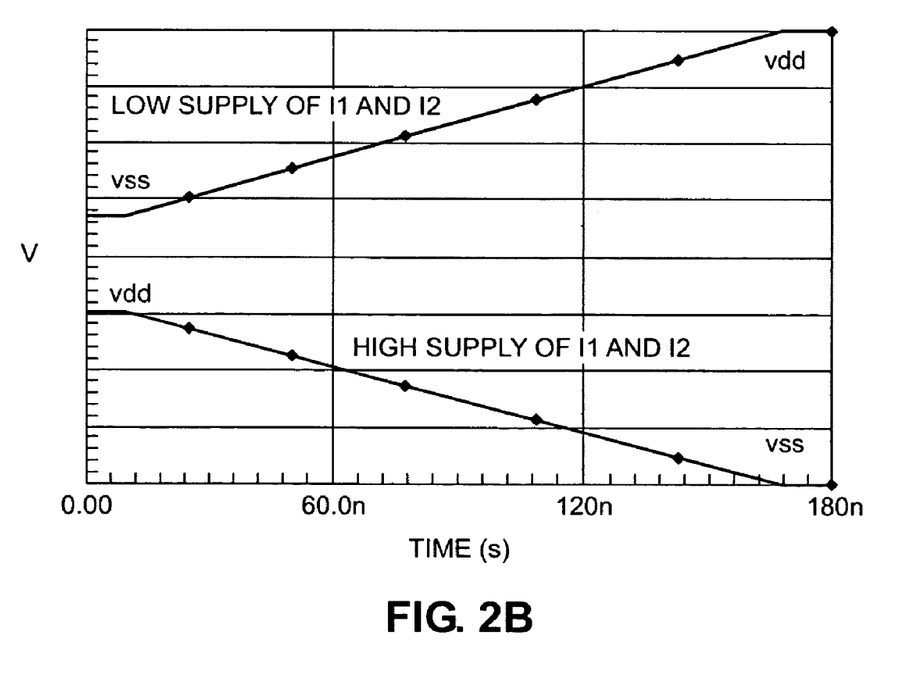
FIG. 2B is a voltage profile of an H-bridge circuit using the circuit shown in FIG. 1.

FIGS. 2A and 2B compare current and voltage versus time for the circuit shown in FIG. 1 using linear ramp-down voltage sources. FIG. 2A is a current profile, having time as its x-axis and current as its y-axis. It shows how the current oscillates and diminishes to zero over time. FIG. 2B is a voltage profile, having time as its x-axis and voltage as its y-axis. It shows how the linear change in voltage corresponds to the diminishing current shown in FIG. 2A.

Figure 3:
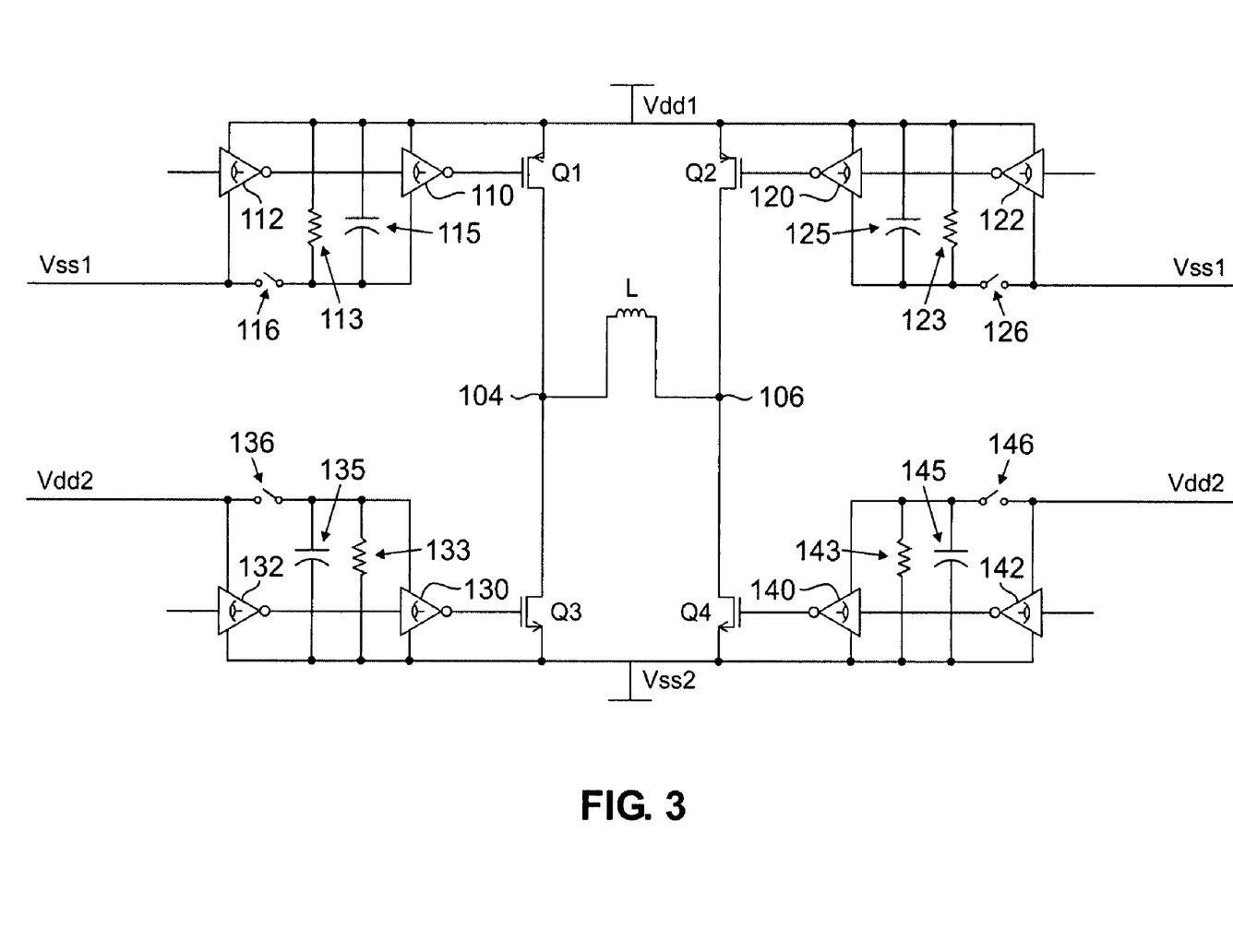
FIG. 3 is an implementation of the invention using RC circuits as the ramp-down voltage sources.

FIG. 3 shows how the invention can be implemented using RC circuits as the ramp-down voltage sources. FIG. 3 is the same as FIG. 1, except that the ramp-down voltage sources have been replaced with RC circuits. FIG. 3 illustrates an H-bridge circuit comprising transistors Q1, Q2, Q3 and Q4 connected in the form of an H, with transistors Q1 and Q3 forming one leg of the H, transistors Q2 and Q4 forming the other leg of the H, and with inductive coil L of the inductive magnetic head connected across the center of the H through load terminals 104 and 106. In the embodiment illustrated in the drawing, transistors Q1 and Q2 are PMOS field effect transistors having their sources connected to a positive voltage source Vdd1 and transistors Q3 and Q4 are NMOS field effect transistors having their sources connected to negative voltage source Vss2. The drains of transistors Q1 and Q3 are connected together and to load terminal 104 and the drains of transistors Q2 and Q4 are connected together and to load terminal 106.

The gates of transistors Q1–Q4 are connected to logic inverters. The gate of transistor Q1 is connected to the output of inverter 110, the gate of transistor Q2 is connected to the output of inverter 120, the gate of transistor Q3 is connected to the output of inverter 130, and the gate of transistor Q4 is connected to the output of inverter 140. The input of inverter 110 is connected to the output of inverter 112, the input of inverter 120 is connected to the output of inverter 122, the input of inverter 130 is connected to the output of inverter 132 and the input of inverter 140 is connected to the output of inverter 142. The inputs of inverters 112, 122, 132 and 142 are connected to the outside circuit of the H-bridge circuit.

Inverters 110, 112, 120 and 122 have upper supply voltages connected to Vdd1 and lower supply voltages connected to Vss1. Inverters 130, 132, 140 and 142 have upper supply voltages connected to Vdd2 and lower supply voltages connected to Vss2.

In place of the ramp-down voltage sources of the circuit shown in FIG. 1, the circuit shown in FIG. 3 has RC circuits. Resistor 113 and capacitor 115 are connected at one end to Vdd1, the upper supply voltage of inverter 110, and the upper voltage supply of inverter 112. The other ends of resistor 113 and capacitor 115 are connected to the lower supply voltage of inverter 110 and to one end of switch 116. The other end of switch 116 is connected to the lower supply voltage of inverter 112 and to Vss1. Resistor 123 and capacitor 125 are connected at one end to Vdd1, the upper supply voltage of inverter 120, and the upper voltage supply of inverter 122. The other ends of resistor 123 and capacitor 125 are connected to the lower supply voltage of inverter 120 and to one end of switch 126. The other end of switch 126 is connected to the lower supply voltage of inverter 122 and to Vss1. Resistor 133 and capacitor 135 are connected at one end to Vss2, the lower supply voltage of inverter 130, and the lower supply voltage of inverter 132. The other ends of resistor 133 and capacitor 135 are connected to the upper supply voltage of inverter 130 and to one end of switch 136. The other end of switch 136 is connected to the upper supply voltage of inverter 132 and to Vdd2. Resistor 133 and capacitor 135 are connected at one end to Vss2, the lower supply voltage of inverter 130, and the lower supply voltage of inverter 132. The other ends of resistor 143 and capacitor 145 are connected to the upper supply voltage of inverter 140 and to one end of switch 146. The other end of switch 146 is connected to the upper supply voltage of inverter 142 and to Vdd2.

During normal operation of the H-bridge circuit shown in FIG. 3, switches 116, 126, 136 and 146 are closed and the inverters are all driven normally. In this normal operation mode, the H-bridge circuit functions like a typical H-bridge circuit. However, when the circuit is switched to its demagnetization mode, switches 16, 26, 36 and 46 are open. As a result, the lower supply voltages of inverters 110 and 120 will ramp to Vdd1, driving the gate voltages of transistors Q1 and Q2 to Vdd1. Because the source of transistor Q1 and the source of transistor Q2 are connected to Vdd1, the gate-source voltage of transistors Q1 and Q2 will drop below their threshold voltage, and transistors Q1 and Q2 will be cut-off. Similarly, the upper supply voltages of inverters 130 and 140 will ramp to Vss2, driving the gate voltages of transistors Q3 and Q4 to Vss2. Because the source of transistor Q1 and the source of transistor Q2 are connected to Vss2, the gate-source voltage of transistors Q3 and Q4 will drop below their threshold voltage, and transistors Q3 and Q4 will be cut-off.

Figure 4:
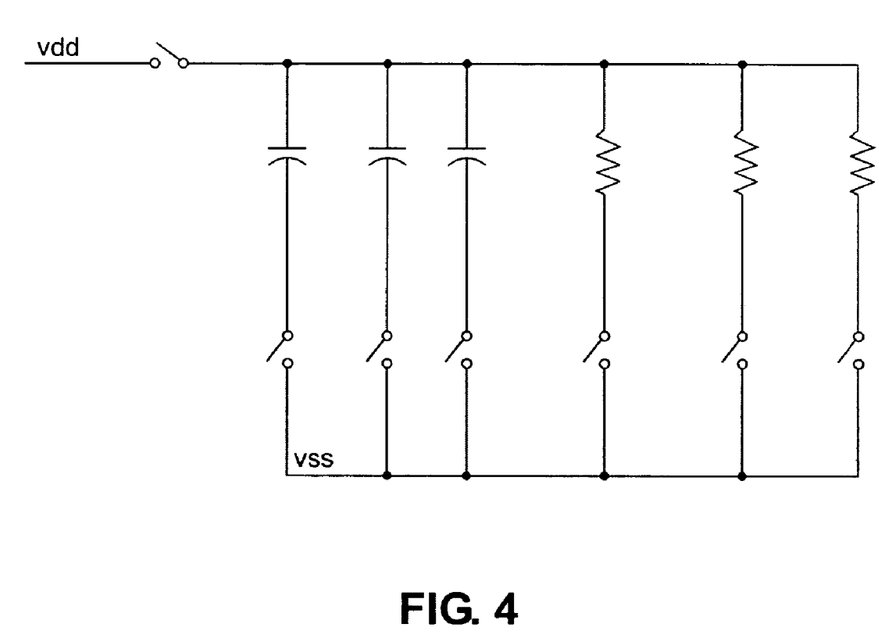
FIG. 4 is an implementation illustrating how programmability may be added to the RC circuit shown in FIG. 3.

The speed at which the supply voltages are ramped is determined by the time constant of the RC circuits. FIG. 4 shows how programmability may be added to the circuit by switchably connecting resistors and capacitors to the circuit. The time constant, and therefore the speed at which the voltage ramps to the supply voltage, may be controlled by adding or subtracting resistors and capacitors to the circuit. Although three resistors and three capacitors are shown in FIG. 4, any number of capacitors and resistors may be added in order to control the voltage ramp to whatever extent is desired.

Figure 5:
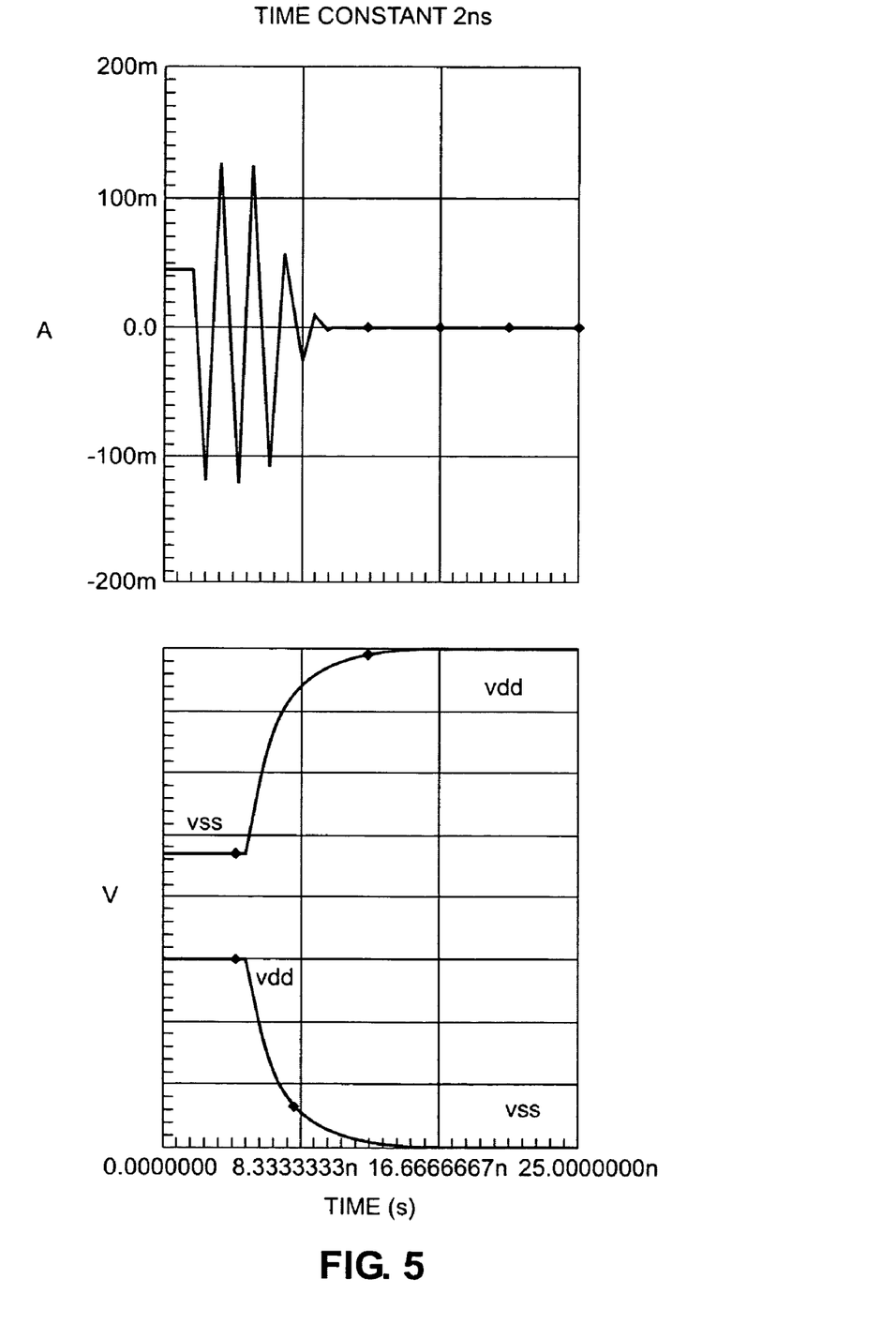
FIG. 5 is a current profile and voltage profile of the circuit shown in FIG. 3.
Figure 6:
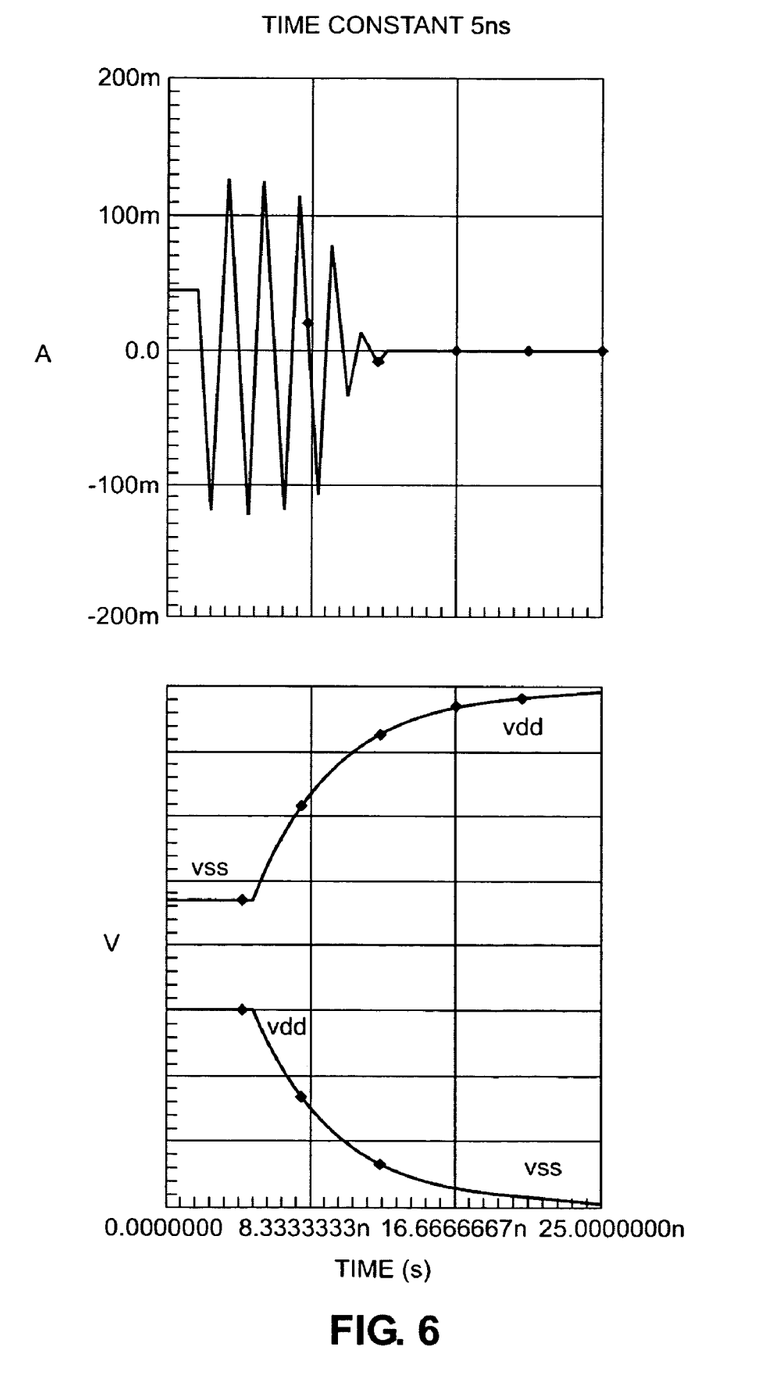
FIG. 6 is a current profile and voltage profile of the circuit shown in FIG. 3, but having a different RC time constant than shown in FIG. 5.
Figure 7:
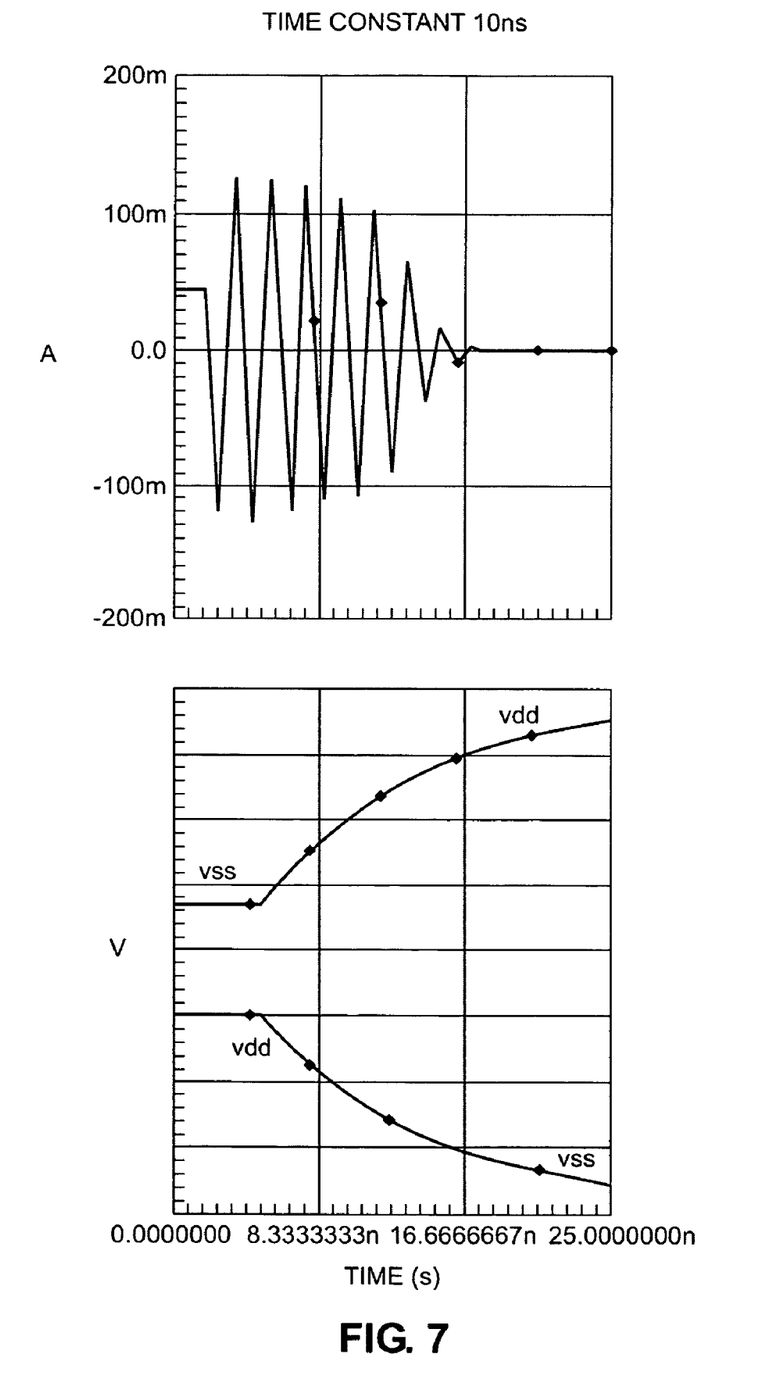
FIG. 7 is a current profile and voltage profile of the circuit shown in FIG. 3, but having a different RC time constant than shown in FIG. 5 and FIG. 6.

FIGS. 5, 6 and 7 demonstrate how the amount of time needed to drive the current through transistors Q1–Q4 to zero can be altered by changing the resistance and capacitance of the voltage sources in order to alter the time constant of the RC circuit. FIG. 5 shows the current profile and voltage change for a circuit with a time constant of 2 nanoseconds. FIG. 6 shows the current profile and voltage change for a circuit with a time constant of 5 nanoseconds. FIG. 7 shows the current profile and voltage change for a circuit with an RC time constant of 10 nanoseconds. As can be seen by comparing FIGS. 5, 6 and 7, a larger RC time constant will result in a larger number of current transitions and, therefore, more thorough demagnetization. However, a greater amount of time is needed. The trade-off of the amount of time needed for demagnetization versus the thoroughness of the demagnetization is a design parameter that can be readily selected by having a programmable RC time constant.

The present invention thus provides a simple addition to an H-bridge circuit that will cause minimal change to the output stage. The amount of time needed to demagnetize the write head depends only on the time constant of the RC circuit.

Although the present invention has been described with reference to preferred embodiments, workers skilled in the art will recognize that changes may be made in form and detail without departing from the spirit and scope of the invention. Particularly, while some forms of the invention are described in the form of discrete devices, it is recognized that the circuit is preferably reduced to practice in the form of an integrated circuit (IC). Therefore, terms such as "device" and the like should be construed in their broadest contexts to include portions of ICs that are conveniently described as functional components, as well as discrete devices. Likewise, some forms of the invention are described in terms of logical gates and chips that could also be implemented by discrete devices, all within the scope and spirit of the present invention. Similarly, the present invention has been described in terms of exemplary embodiments employing MOS transistor devices having a control region (gate) and multiple controlled regions (source and drain). It will be understood by those skilled in the art that the principles of the present invention are applicable to circuits that employ other active devices having control and controlled regions or terminals.

The invention claimed is:

1. A demagnetizer for an inductive load comprising:
a driver circuit including at least one transistor, the transistor having a control region, a first controlled region, a second controlled region and a threshold voltage, the first controlled region being adapted for connection to a power supply, and the second controlled region being adapted for connection to the inductive load; and
a ramp-down voltage circuit connected to provide an output voltage to the control region of the transistor, wherein the output voltage provided to the control region of the transistor when the ramp-down voltage circuit is in a first state is based on an input signal provided to the ramp-down voltage circuit, and wherein the output voltage provided to the control region of the transistor when the ramp-down voltage circuit is in a second state is ramped toward the threshold voltage of the transistor and oscillates based on the input signal to create a declining, oscillating current through the inductive load.

2. The demagnetizer of claim 1 wherein the transistor is a field effect transistor having a gate, a source and a drain, wherein the control region is the gate, the first controlled region is the source, and the second controlled region is the drain.

3. The demagnetizer of claim 1 wherein the ramp-down voltage circuit is programmable.

4. The demagnetizer of claim 1 wherein the inductive load is a write head.

5. The demagnetizer of claim 1 wherein the driver circuit is an H-bridge circuit.

6. A process for removing remnant magnetization from an inductive load, the process comprising:
applying an oscillating signal to an input of a ramp-down voltage circuit, resulting in an oscillating output voltage being provided to a control region of a transistor, the transistor having a first controlled region adapted for connection to a voltage source, a second controlled region adapted for connection to the inductive load, and a threshold voltage; and
switching the ramp-down voltage circuit from a first state, in which the output voltage provided to the control region of the transistor is based on the signal applied to the input of the ramp-down voltage circuit, to a second state in response to a commanded demagnetization mode, in which the output voltage ramps towards the threshold voltage of the transistor and oscillates based on the oscillating signal applied to the input of the ramp-down voltage circuit to create an oscillating, decreasing current in the inductive load.

7. The process of claim 6 wherein the transistor is a field effect transistor having a gate, a source and a drain, wherein the control region is the gate of the field effect transistor.

8. The process of claim 6 wherein the ramp-down voltage circuit is programmable.

9. The process of claim 6 wherein the inductive load is a write head.

10. A demagnetizer for an inductive write head comprising:
an H-bridge circuit including a first transistor, a second transistor, a third transistor and a fourth transistor, each of the transistors having a control region, a first controlled region, a second controlled region and a threshold voltage, the first controlled regions of the first transistor and the second transistor being adapted for connection to a first power supply, the first controlled regions of the third transistor and the fourth transistor being adapted for connection to a second power supply, the second controlled regions of the first and third transistors being adapted for connection to a first side of the inductive write head, and the second controlled regions of the second and fourth transistors being adapted for connection to a second side of the inductive write head; and
a first ramp-down voltage circuit connected to the control region of the first transistor, a second ramp-down voltage circuit connected to the control region of the second transistor, a third ramp-down voltage circuit connected to the control region of the third transistor, and a fourth ramp-down voltage circuit connected to the control region of the fourth transistor, the ramp-down voltage circuits being operable to drive an oscillating voltage between the control region and the first controlled region of the corresponding transistor below the threshold voltage in response to a commanded switch to demagnetization mode.

11. The demagnetizer of claim 10 wherein the first transistor, the second transistor, the third transistor and the fourth transistor are field effect transistors each having a gate, a drain and a source, wherein the control region is the gate.

12. The demagnetizer of claim 10 wherein each of the ramp-down voltage circuits are programmable.

13. The demagnetizer of claim 10 wherein the ramp-down voltage circuits connected to the first and second transistors each include:
   a ramp-down voltage supply switchably connected to the first power supply; and
   an inverter circuit having a first power supply node adapted for connection to the first power supply, a second power supply node connected to the ramp-down voltage source, and an output node connected to the control region of the transistor.

14. The demagnetizer of claim 13 wherein the ramp-down voltage supply is an RG circuit.

15. The demagnetizer of claim 10 wherein the ramp-down voltage circuits connected to the third and fourth transistors each include:
   a ramp-down voltage supply switchably connected to the second power supply; and
   an inverter circuit having a first power supply node adapted for connection to the second power supply, a second power supply node adapted for connection to the ramp-down voltage supply, and an output node adapted for connection to the control region of the transistor.

16. A demagnetizer for an inductive load comprising:
   a driver circuit including at least one transistor, the transistor having a control region, a first controlled region, a second controlled region and a threshold voltage, the first controlled region being adapted for connection to a power supply, and the second controlled region being adapted for connection to the inductive load;
   a ramp-down voltage circuit connected to provide an output voltage to the control region of the transistor, wherein the output voltage provided to the control region of the transistor when the ramp-down voltage circuit is in a first state is based on an input signal provided to the ramp-down voltage circuit, and wherein the output voltage provided to the control region of the transistor when the ramp-down voltage circuit is in a second state is ramped toward the threshold voltage of the transistor and oscillates based on the input signal to create a declining, oscillating current through the inductive load;
   an inverter circuit connected to provide the output voltage to the control region of the transistor based on the input signal, the inverter circuit having a first power supply node and a second power supply node, wherein the first power supply node is adapted for connection to the power supply; and
   a ramp-down voltage source switchably connected to the second power supply node of the inverter circuit in response to the commanded switch to demagnetization mode, wherein connecting the ramp-down voltage source to the second power supply node of the inverter causes the output voltage signal to gradually ramp towards the threshold voltage.

17. The demagnetizer of claim 16, wherein connecting the ramp-down voltage source to the second power supply of the inverter circuit causes the output voltage at the control region to drop below the threshold voltage at a time t determined by the ramp-down voltage source.

18. The demagnetizer of claim 16, wherein the ramp-down voltage supply is an RC circuit adapted for connection between the power supply and the second power supply node of the inverter.

19. The demagnetizer of claim 18, wherein the RC circuit consists of a plurality of resistors and a plurality of capacitors, wherein each of the plurality of resistors and each of the plurality of capacitors may be selectively included as part of the RC circuit in order to program an amount of time following connection of the ramp-down voltage source before voltage at the control region of the transistor drops below the threshold voltage.

20. A process for removing remnant magnetization from an inductive load, the process comprising:
   applying an oscillating signal to an input of a ramp-down voltage circuit, resulting in an oscillating output voltage being provided to a control region of a transistor, the transistor having a first controlled region adapted for connection to a voltage source, a second controlled region adapted for connection to the inductive load, and a threshold voltage;
   switching the ramp-down voltage circuit from a first state, in which the output voltage provided to the control region of the transistor is based on the signal applied to the input of the ramp-down voltage circuit, to a second state in response to a commanded demagnetization mode, in which the output voltage ramps towards the threshold voltage of the transistor and oscillates based on the oscillating signal applied to the input of the ramp-down voltage circuit to create an oscillating, decreasing current in the inductive load; and
   switchably connecting an RC circuit between the voltage source and a power supply node of an inverter, which causes the voltage provided to the control region of the transistor to ramp towards the threshold voltage of the transistors.

\* \* \* \* \*